US010755597B2

(12) United States Patent
Cho et al.

(10) Patent No.: US 10,755,597 B2
(45) Date of Patent: Aug. 25, 2020

(54) METHOD AND APPARATUS FOR CALCULATING MEAL PERIOD

(71) Applicant: AJOU UNIVERSITY INDUSTRY-ACADEMIC COOPERATION FOUNDATION, Suwon-si, Gyeonggi-do (KR)

(72) Inventors: We Duke Cho, Seongnam-si (KR); Kyeong Chan Park, Suwon-si (KR); Sun Taag Choe, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 455 days.

(21) Appl. No.: 15/499,429

(22) Filed: Apr. 27, 2017

(65) Prior Publication Data
US 2017/0316715 A1    Nov. 2, 2017

(30) Foreign Application Priority Data

Apr. 29, 2016 (KR) .................. 10-2016-0053335
Aug. 4, 2016 (KR) .................. 10-2016-0099373

(51) Int. Cl.
*G09B 19/00* (2006.01)
(52) U.S. Cl.
CPC .................. *G09B 19/0092* (2013.01)
(58) Field of Classification Search
CPC .. G09B 19/0092; A61B 5/0205; G01P 15/034
See application file for complete search history.

(56) References Cited

U.S. PATENT DOCUMENTS

| 9,483,930 | B1 * | 11/2016 | Haaland | G08B 21/245 |
|---|---|---|---|---|
| 2009/0164219 | A1 * | 6/2009 | Yeung | G06F 3/0346 704/258 |
| 2010/0145171 | A1 * | 6/2010 | Park | A61B 5/1455 600/324 |
| 2014/0377724 | A1 * | 12/2014 | Hoover | G06K 9/00355 434/127 |
| 2017/0220772 | A1 * | 8/2017 | Vleugels | A61B 5/7282 |

FOREIGN PATENT DOCUMENTS

KR    10-0981137 B1    9/2010

* cited by examiner

*Primary Examiner* — Mohamed Charioui
*Assistant Examiner* — Eyob Hagos
(74) *Attorney, Agent, or Firm* — Stein IP, LLC

(57) ABSTRACT

Disclosed are a method and an apparatus for calculating a meal period, the method including: calculating, by a wrist acceleration calculating unit, a wrist acceleration variation value which is a variation value of acceleration in respect to a motion of a user's wrist which is measured based on gravitational acceleration; calculating, by a wrist angle calculating unit, a wrist angle variation value which is a variation value of an angle to the user's wrist based on a gravitational direction by using the wrist acceleration variation value; detecting, by an eating behavior candidate pattern detecting unit, an eating behavior candidate pattern based on a predetermined reference by applying one or more threshold values to the wrist angle variation value; and calculating, by a meal period calculating unit, a meal period based on the number of times the eating behavior candidate pattern occurs.

14 Claims, 15 Drawing Sheets

FIG. 15

| Total Record Time 09:42:52 | | Estimated Class | | ACCURACY (%) ERROR(%) |
|---|---|---|---|---|
| | | Meal-Time 00:39:32 6.7847% | Non Meal-Time 09:03:20 93.215% | |
| Actual Class | Meal-Time 00:37:59 6.519% | True Positive 00:36:55 6.334% | False Negative 00:01:04 0.185% | 97.159%(TPR) 2.842%(FNR) |
| | Non Meal-Time 09:04:53 93.481% | False Positive 00:02:37 0.451% | True Negative 09:02:16 93.03% | 99.517%(TNR) 0.483%(FPR) |
| TIME FORMAT hh:mm:ss | | 93.351%(PPV) 6.649%(FDR) | 99.801%(NPV) 0.199%(FOR) | 99.36%(ACC) 0.64%(ERR) | ically

METHOD AND APPARATUS FOR CALCULATING MEAL PERIOD

CROSS-REFERENCE TO RELATED APPLICATIONS

This application claims the priority of Korean Patent Application Nos. 10-2016-0053335 filed on Apr. 29, 2016, 10-2016-0099373 filed on Aug. 4, 2016 in the Korean Intellectual Property Office, the disclosure of which is incorporated herein by reference.

BACKGROUND

Field

Exemplary embodiments of the present disclosure relate to a method and an apparatus for calculating a meal period which calculate a meal period by using a variation value of acceleration in respect to a motion of a user's wrist which is measured based on gravitational acceleration.

Description of the Related Art

Recently, as various types of smart devices such as smart phones have been developed, interests in wearable devices, which are operated in conjunction with or independently of the smart devices, have been gradually increased. The increase in interests directly affects an increase in distribution rate of the wearable devices, and as the distribution rate of the wearable device is increased, accessibility to the wearable device is improved, such that various researches using the wearable devices are being conducted.

A user always carries the wearable device, and particularly, the wearable device may be used by being mounted on a part of the user's body. Various sensors such as an acceleration sensor and a gyro sensor are embedded in the wearable device, and as a result, the advantage of the wearable device is that various types of information such as motion information of the user, who goes about his/her daily life, may be continuously obtained.

Researches on methods, which determine various types of dietary habits such as a meal period of a user by utilizing the wearable device, have been conducted, but these methods need to complexly use a plurality of sensors, which causes an algorithm to be complicated and causes an increase in costs of the wearable device.

Meanwhile, in a case in which a single sensor is used to determine various types of dietary habits such as the user's meal period by utilizing the wearable device, there is a problem in that determination accuracy deteriorates.

Therefore, there is a need for a method and an apparatus for calculating a meal period which may determine various types of dietary habits such as the user's meal period only by utilizing an acceleration sensor.

DOCUMENT OF RELATED ART

Patent Document

Korean Patent No. 10-0981137 (Sep. 2, 2010)

SUMMARY

An object of the present disclosure is to solve the problems, and to more accurately calculate a user's meal period by using a device worn on a wrist.

In addition, another object of the present disclosure is to reduce costs by using only a single sensor to calculate a user's meal period in comparison with a case in which a plurality of sensors is used.

Technical problems of the present disclosure are not limited to the aforementioned technical problem, and other technical problems, which are not mentioned above, may be clearly understood by those skilled in the art from the following descriptions.

According to an aspect of the present disclosure, there is provided a method of calculating a meal period, the method including: calculating, by a wrist acceleration calculating unit, a wrist acceleration variation value which is a variation value of acceleration in respect to a motion of a user's wrist which is measured based on gravitational acceleration; calculating, by a wrist angle calculating unit, a wrist angle variation value which is a variation value of an angle to the user's wrist based on a gravitational direction by using the wrist acceleration variation value; detecting, by an eating behavior candidate pattern detecting unit, an eating behavior candidate pattern based on a predetermined reference by applying one or more threshold values to the wrist angle variation value; and calculating, by a meal period calculating unit, a meal period based on the number of times the eating behavior candidate pattern occurs.

According to the exemplary embodiment, the acceleration in respect to the motion of the user's wrist is measured by using a three-axis acceleration sensor, and the calculating of the wrist acceleration variation value may include: measuring, by the wrist acceleration calculating unit, initial gravitational acceleration with respect to three axes of the acceleration sensor in an initial state in which one of the three axes of the acceleration sensor is positioned toward a ground surface; calculating, by the wrist acceleration calculating unit, an initial angle between the gravitational direction and one of the three axes of the acceleration sensor by using the measured initial gravitational acceleration with respect to the three axes of the acceleration sensor; converting, by the wrist acceleration calculating unit, by using the calculated initial angle, the gravitational acceleration, which is measured in real time at the three axes of the acceleration sensor, into converted gravitational acceleration which is gravitational acceleration with respect to three gravitational axes that are three axes using the gravitational direction as a reference axis; and calculating, by the wrist acceleration calculating unit, a variation value of the converted gravitational acceleration corresponding to the reference axis which varies in accordance with the motion of the user's wrist, as the wrist acceleration variation value.

For example, the calculating of the wrist acceleration variation value may further include calculating, by the wrist acceleration calculating unit, a modified wrist acceleration variation value by removing a variation value of the acceleration in respect to the motion of the user's wrist which has a period shorter than a preset length among the variation values of the acceleration in respect to the motion of the user's wrist, and the calculating of the wrist angle variation value may be performed based on the modified wrist acceleration variation value.

For example, the wrist acceleration calculating unit may remove a variation value of the acceleration in respect to the motion of the user's wrist which has a period shorter than the preset length by using a low pass filter (LPF).

According to the exemplary embodiment, in the calculating of the wrist angle variation value, the wrist angle calculating unit may calculate a normalized wrist acceleration variation value by normalizing the wrist acceleration variation value, and then calculate the wrist angle variation value by calculating an inverse function of cosine with respect to the normalized wrist acceleration variation value.

For example, in the detecting of the eating behavior candidate pattern, the one or more threshold values may include a first threshold value, and a second threshold value which is an angle value greater than the first threshold value, and the eating behavior candidate pattern detecting unit may detect the eating behavior candidate pattern by detecting a pattern in which the wrist angle variation value starts with an angle value smaller than the first threshold value and increases to an angle value greater than the second threshold value, and then the wrist angle variation value starts with an angle value greater than the second threshold value and decreases to an angle value smaller than the first threshold value.

According to the exemplary embodiment, the eating behavior candidate pattern may have an angle value between a minimum limit value, which is an angle value smaller than the first threshold value, and a maximum limit value which is an angle value greater than the second threshold value.

For example, the calculating of the meal period may include: calculating, by the meal period calculating unit, a cumulative result in respect to the eating behavior candidate pattern by accumulating the number of times the eating behavior candidate pattern occurs; defining, by the meal period calculating unit, a case, in which the eating behavior candidate pattern occurs a preset number of times or more for a preset time based on the cumulative result, as a partial eating behavior which is a part of an overall eating behavior of the user; and determining, by the meal period calculating unit, the overall eating behavior including the determined partial eating behavior of the user, and calculating a total duration time of the overall eating behavior as the meal period.

For example, in the calculating of the meal period, the meal period calculating unit may calculate a corrected meal period by further adding a preset time before an initial detection point in time of the overall eating behavior into the calculated meal period.

According to an aspect of the present disclosure, there is provided an apparatus for calculating a meal period, the apparatus including: a wrist acceleration calculating unit which calculates a wrist acceleration variation value which is a variation value of acceleration in respect to a motion of a user's wrist which is measured based on gravitational acceleration; a wrist angle calculating unit which calculates a wrist angle variation value which is a variation value of an angle to the user's wrist based on a gravitational direction by using the wrist acceleration variation value; an eating behavior candidate pattern detecting unit which detects an eating behavior candidate pattern based on a predetermined reference by applying one or more threshold values to the wrist angle variation value; and a meal period calculating unit which calculates a meal period based on the number of times the eating behavior candidate pattern occurs.

For example, the apparatus for calculating a meal period according to the exemplary embodiment of the present disclosure may further include a three-axis acceleration sensor which measures the acceleration in respect to the motion of the user's wrist, in which the wrist acceleration calculating unit measures initial gravitational acceleration with respect to three axes of the acceleration sensor in an initial state in which one of the three axes of the acceleration sensor is positioned toward a ground surface, calculates an initial angle between the gravitational direction and one of the three axes of the acceleration sensor by using the measured initial gravitational acceleration with respect to the three axes of the acceleration sensor, converts, by using the calculated initial angle, the gravitational acceleration, which is measured in real time at the three axes of the acceleration sensor, into converted gravitational acceleration which is gravitational acceleration with respect to three gravitational axes that are three axes using the gravitational direction as a reference axis, and calculates a variation value of the converted gravitational acceleration corresponding to the reference axis which varies in accordance with the motion of the user's wrist, as the wrist acceleration variation value.

For example, the wrist acceleration calculating unit may calculate a modified wrist acceleration variation value by removing a variation value of the acceleration in respect to the motion of the user's wrist which has a period shorter than a preset length among the variation values of the acceleration in respect to the motion of the user's wrist, and the wrist angle calculating unit may calculate the wrist angle variation value based on the modified wrist acceleration variation value.

According to the exemplary embodiment, the wrist acceleration calculating unit may remove a variation value of the acceleration in respect to the motion of the user's wrist which has a period shorter than the preset length by using a low pass filter (LPF).

According to the exemplary embodiment, the wrist angle calculating unit may calculate a normalized wrist acceleration variation value by normalizing the wrist acceleration variation value, and then calculate the wrist angle variation value by calculating the inverse function of cosine with respect to the normalized wrist acceleration variation value.

For example, the one or more threshold values may include a first threshold value, and a second threshold value which is an angle value greater than the first threshold value, and the eating behavior candidate pattern detecting unit may detect the eating behavior candidate pattern by detecting a pattern in which the wrist angle variation value starts with an angle value smaller than the first threshold value and increases to an angle value greater than the second threshold value, and then the wrist angle variation value starts with an angle value greater than the second threshold value and decreases to an angle value smaller than the first threshold value.

For example, the eating behavior candidate pattern may have an angle value between a minimum limit value, which is an angle value smaller than the first threshold value, and a maximum limit value which is an angle value greater than the second threshold value.

According to the exemplary embodiment, the meal period calculating unit may calculate a cumulative result in respect to the eating behavior candidate pattern by accumulating the number of times the eating behavior candidate pattern occurs, may define a case, in which the eating behavior candidate pattern occurs a preset number of times or more for a preset time based on the cumulative result, as a partial eating behavior which is a part of an overall eating behavior of the user, and may determine the overall eating behavior including the determined partial eating behavior of the user, and calculating a total duration time of the overall eating behavior as the meal period.

According to the exemplary embodiment, the meal period calculating unit may calculate a corrected meal period by further adding a preset time before an initial detection point in time of the overall eating behavior into the calculated meal period.

Other detailed matters of the exemplary embodiment are included in the detailed description and the accompanying drawings.

According to the exemplary embodiment of the present disclosure, it is possible to more accurately calculate a user's meal period by utilizing a device worn on the wrist.

In addition, according to the exemplary embodiment of the present disclosure, it is possible to reduce costs by using only a single sensor to calculate a user's meal period in comparison with a case in which a plurality of sensors is used.

Furthermore, according to the exemplary embodiment of the present disclosure, it is possible to calculate a user's meal period by measuring an angle between a gravitational direction and a wrist direction, and thus it is possible to apply the method and the apparatus to design recognition models of irregular behaviors having no motion acceleration component.

BRIEF DESCRIPTION OF THE DRAWINGS

The above and other aspects, features and other advantages of the present disclosure will be more clearly understood from the following detailed description taken in conjunction with the accompanying drawings, in which:

FIG. 15 is a view for explaining accuracy of meal period calculation by the method and the apparatus for calculating a meal period according to the exemplary embodiment of the present disclosure.

DETAILED DESCRIPTION OF THE PREFERRED EMBODIMENT

Figure 1:
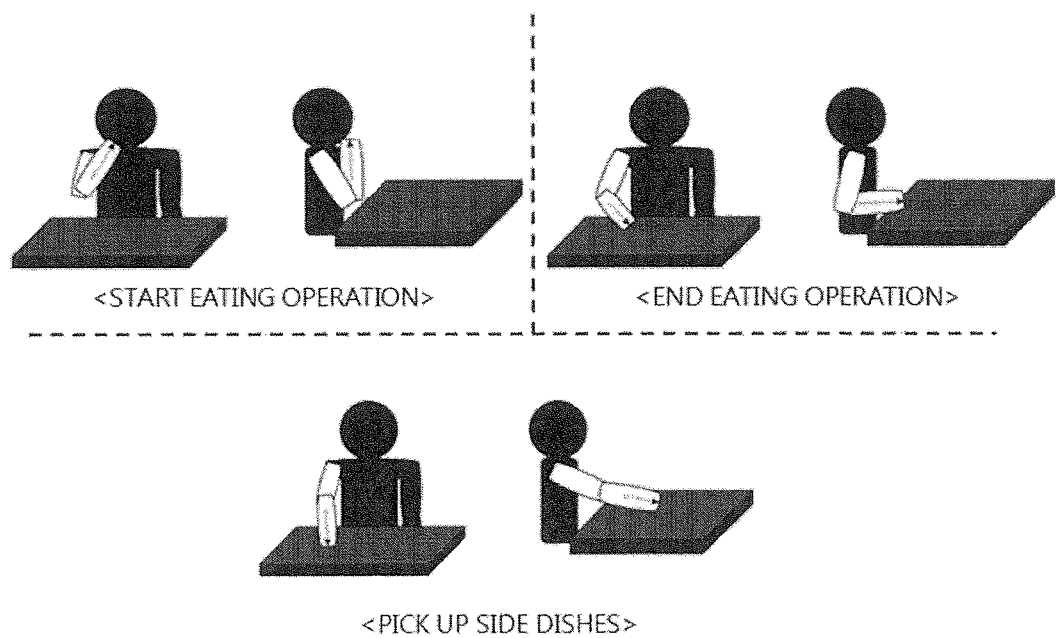
FIG. 1 is a view for explaining an operation principle of a method and an apparatus for calculating a meal period according to an exemplary embodiment of the present disclosure.

Hereinafter, the exemplary embodiments of the present disclosure will be described with reference to the accompanying drawings in detail so that those skilled in the art may easily carry out the present disclosure. First, when reference numerals refer to constituent elements of each drawing, it should be noted that although the same constituent elements are illustrated in different drawings, the same constituent elements are referred to by the same reference numerals as possible. Further, in the following description of the present disclosure, a detailed description of publicly known configurations or functions incorporated herein will be omitted when it is determined that the detailed description may make the subject matter of the present disclosure unclear.

Hereinafter, a method and an apparatus for calculating a meal period according to an exemplary embodiment of the present disclosure will be described in detail with reference to the accompanying drawings.

Figure 2:
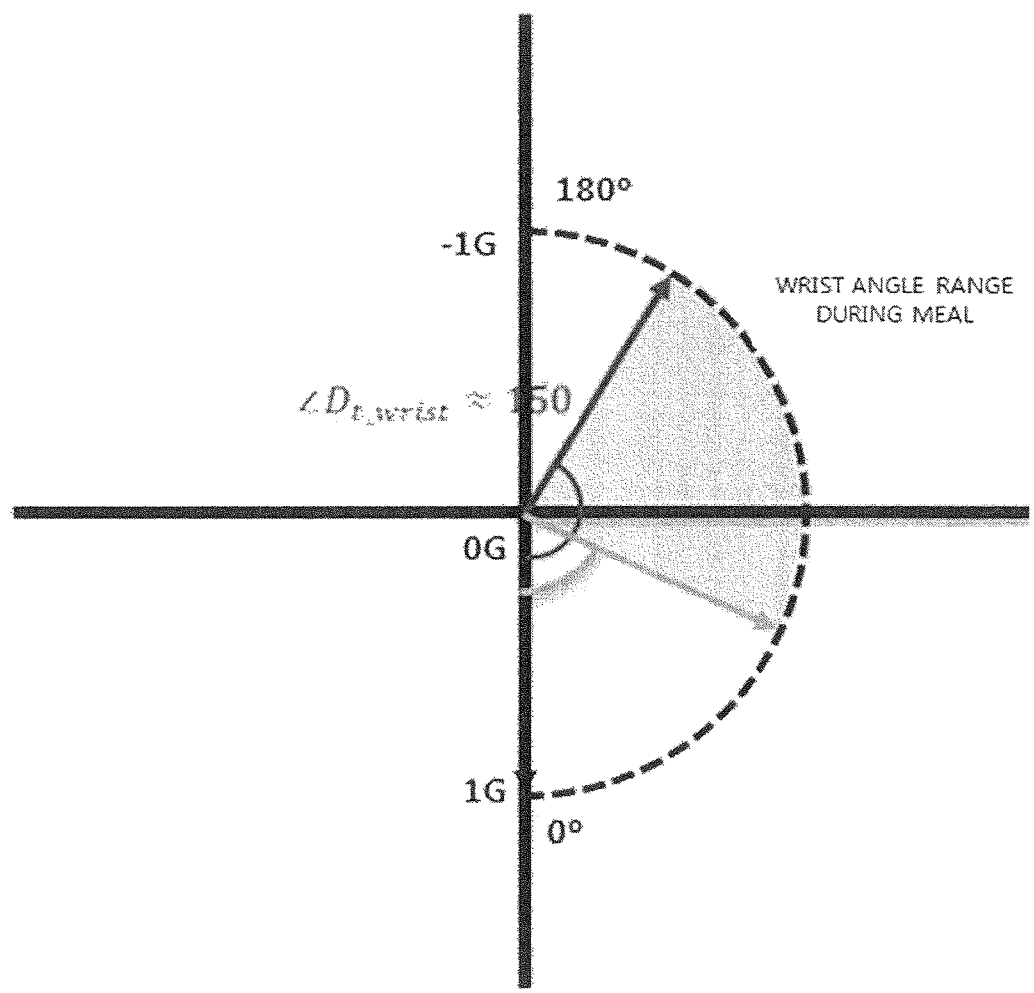
FIG. 2 is a view for explaining a range of an angle of a wrist during a meal in a case in which the method and the apparatus for calculating a meal period according to the exemplary embodiment of the present disclosure are used to calculate a meal period.

FIG. 1 is a view for explaining an operation principle of the method and the apparatus for calculating a meal period according to an exemplary embodiment of the present disclosure. FIG. 2 is a view for explaining a range of an angle of a wrist during a meal in a case in which the method and the apparatus for calculating a meal period according to the exemplary embodiment of the present disclosure are used to calculate a meal period.

Referring to FIG. 1, an eating operation may broadly include three operations during a meal period.

For example, a total of three eating operations during the meal period may include an operation of putting food into a mouth from a utensil as an eating start operation, an operation of placing a hand on a table as an eating end operation, and an operation of picking up side dishes.

The eating operations may partially vary in accordance with dietary habits of persons who have a meal, but as illustrated in FIG. 2, a range of an angle of a wrist during a meal may be 70 degrees to 150 degrees based on a gravitational direction (0 degree).

According to the exemplary embodiment, the method and the apparatus for calculating a meal period according to the exemplary embodiment of the present disclosure may calculate a meal period by using a preset error range in order to correct an error caused by a dietary habit of a user or a trembling hand.

For example, the preset error range may be 20 degrees.

Here, the method and the apparatus for calculating a meal period according to the exemplary embodiment of the present disclosure may detect an eating behavior candidate pattern by using the range of the angle of the wrist during a meal period based on the gravitational direction during a meal period, and then may detect a meal period by accumulating the number of detected eating behavior candidate patterns and when the number of repeated eating behavior candidate patterns satisfies a preset condition.

Therefore, the apparatus for calculating a meal period according to the exemplary embodiment of the present disclosure is worn on the user's wrist and calculates the acceleration and the angle of the wrist during a meal based on the gravitational direction during a meal period.

According to the exemplary embodiment, the eating behavior candidate pattern may mean a pattern in which a series of processes from the operation of putting food into the mouth from a utensil as the eating start operation to the operation of placing the hand on the table as the eating end operation as illustrated in FIG. 1 are carried out once.

For example, the meal period may mean an overall duration time of the entire eating behavior including one or more partial eating behaviors in which the eating behavior candidate pattern are repeated a preset number of times for a preset time.

In particularly, the method and the apparatus for calculating a meal period according to the exemplary embodiment of the present disclosure may be ideally operated in a case in which the following assumptions are satisfied, but the present disclosure is not limited thereto.

The first assumption is that there is no motion acceleration component of the wrist during the eating behavior. The second assumption is that the eating behavior is carried out by various types of utensils such as a spoon, a fork, and a knife. The third assumption is that the user holds various types of utensils with proper grip.

The method and the apparatus for calculating a meal period according to the exemplary embodiment of the present disclosure may be operated under a condition in which the aforementioned assumptions are satisfied, but the meal period may be calculated similarly even in a situation in which the aforementioned assumptions are not satisfied.

Now, the method and the apparatus for calculating a meal period according to the exemplary embodiment of the present disclosure will be described with reference to FIGS. 3 to 15.

Figure 3:
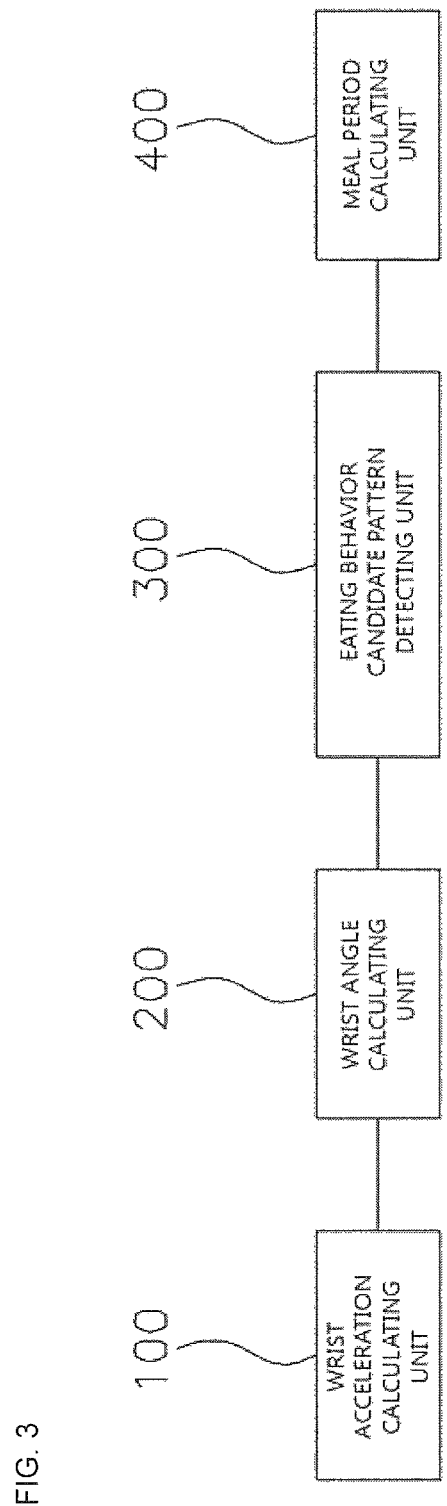
FIG. 3 is a configuration diagram for explaining the apparatus for calculating a meal period according to the exemplary embodiment of the present disclosure.

FIG. 3 is a configuration diagram for explaining the apparatus for calculating a meal period according to the exemplary embodiment of the present disclosure.

As illustrated in FIG. 3, the apparatus for calculating a meal period according to the exemplary embodiment of the present disclosure may include a wrist acceleration calculating unit 100, a wrist angle calculating unit 200, an eating behavior candidate pattern detecting unit 300, and a meal period calculating unit 400.

According to the exemplary embodiment, the apparatus for calculating a meal period according to the exemplary embodiment of the present disclosure may further include an acceleration sensor (not illustrated).

The acceleration sensor (not illustrated) may measure acceleration of a motion of a user's wrist based on gravitational acceleration with respect to a total of three axes including an x-axis, a y-axis, and a z-axis.

The wrist acceleration calculating unit 100 may calculate a wrist acceleration variation value which is a variation value of the acceleration in respect to the motion of the use's wrist which is measured based on gravitational acceleration.

According to the exemplary embodiment, the wrist acceleration calculating unit 100 may include an acceleration sensor (not illustrated).

The wrist angle calculating unit 200 may calculate a wrist angle variation value, which is a variation value of an angle to the user's wrist, based on the gravitational direction by using the wrist acceleration variation value.

The eating behavior candidate pattern detecting unit 300 may detect an eating behavior candidate pattern based on a predetermined reference by applying one or more threshold values to the wrist angle variation value.

The meal period calculating unit 400 may calculate a meal period based on the number of times the eating behavior candidate pattern occurs.

Hereinafter, the respective constituent elements of the apparatus for calculating a meal period according to the exemplary embodiment of the present disclosure will be specifically described in detail with reference to FIGS. 4 to 15, a repeated description will be omitted.

Figure 4:
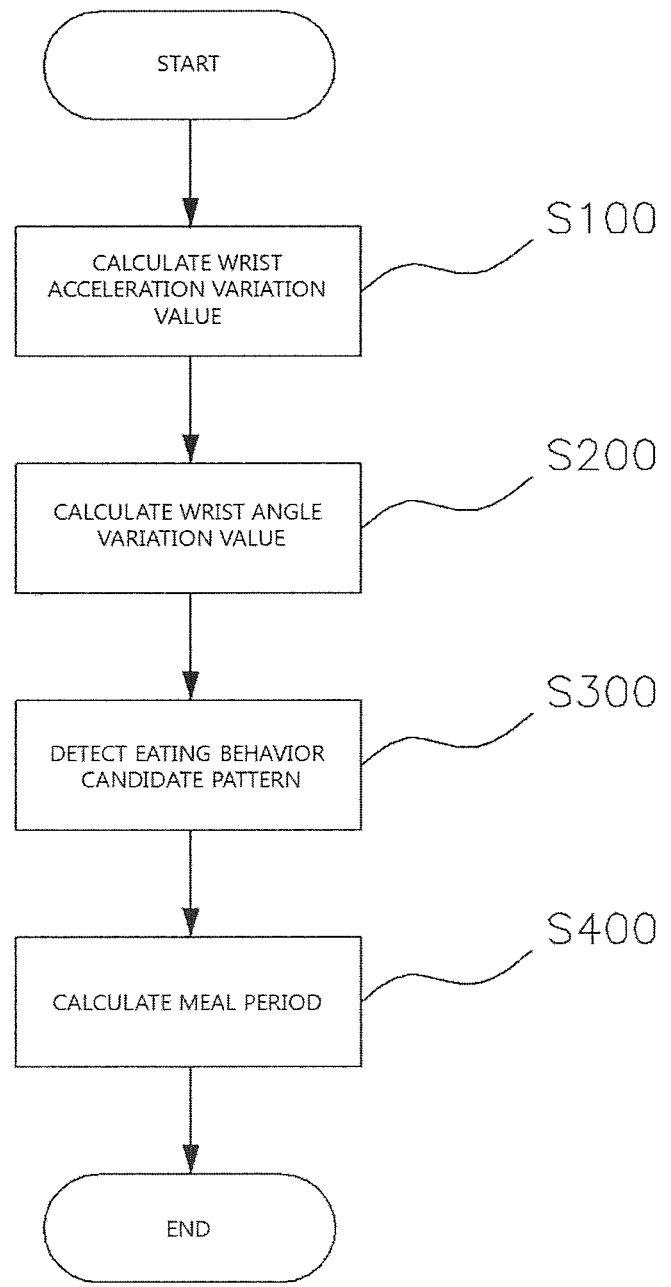
FIG. 4 is a flowchart for explaining the method of calculating a meal period according to the exemplary embodiment of the present disclosure.

FIG. 4 is a flowchart for explaining the method of calculating a meal period according to the exemplary embodiment of the present disclosure.

As illustrated in FIG. 4, the method of calculating a meal period according to the exemplary embodiment of the present disclosure may include a wrist acceleration variation value calculating step S100, a wrist angle variation value calculating step S200, an eating behavior candidate pattern detecting step S300, and a meal period calculating step S400.

In step S100, the wrist acceleration calculating unit 100 calculates a wrist acceleration variation value which is a variation value of acceleration in respect to the motion of the use's wrist which is measured by the acceleration sensor (not illustrated) based on gravitational acceleration.

According to the exemplary embodiment, in step S100, the apparatus for calculating a meal period according to the exemplary embodiment of the present disclosure may calculate the wrist acceleration variation value which is a variation value of gravitational acceleration applied based on the gravitational direction with respect to the user's wrist corresponding to the motion of the user's wrist by using a three-axis acceleration sensor (not illustrated) worn on the user's wrist.

In this case, in a case in which the user lowers his/her wrist toward the ground surface so that the wrist is positioned to coincide with the gravitational direction before performing the eating behavior, the overall gravitational acceleration is applied to the user's wrist, and as a result, the wrist acceleration, which is the gravitational acceleration applied to the wrist, may be 1G.

Next, when the user begins to perform the eating behavior and slowly moves the utensil toward the mouth in order to put food into the mouth, the gravitational acceleration applied to the wrist is also slowly decreased, the wrist acceleration is gradually decreased, and the wrist acceleration becomes a minus value from any moment.

When the user stops the wrist motion while putting food into the mouth, the minus gravitational acceleration value corresponding to the position of the wrist is maintained. As described above, in the method and the apparatus for calculating a meal period according to the exemplary embodiment of the present disclosure, the wrist acceleration value, which varies in accordance with the motion of the user's wrist over time, is set to the wrist acceleration variation value, and the meal period is calculated based on the wrist acceleration variation value.

According to the exemplary embodiment, in step S100, the wrist acceleration calculating unit 100 may calculate the wrist acceleration variation value based on a variation of an initial angle which is an angle between the gravitational direction and one of three sensor axes and is calculated in an initial state in which one of the three sensor axes, which are the three-axis (x, y, and z axes) of the acceleration sensor (not illustrated), is positioned toward the ground surface.

Figure 5:
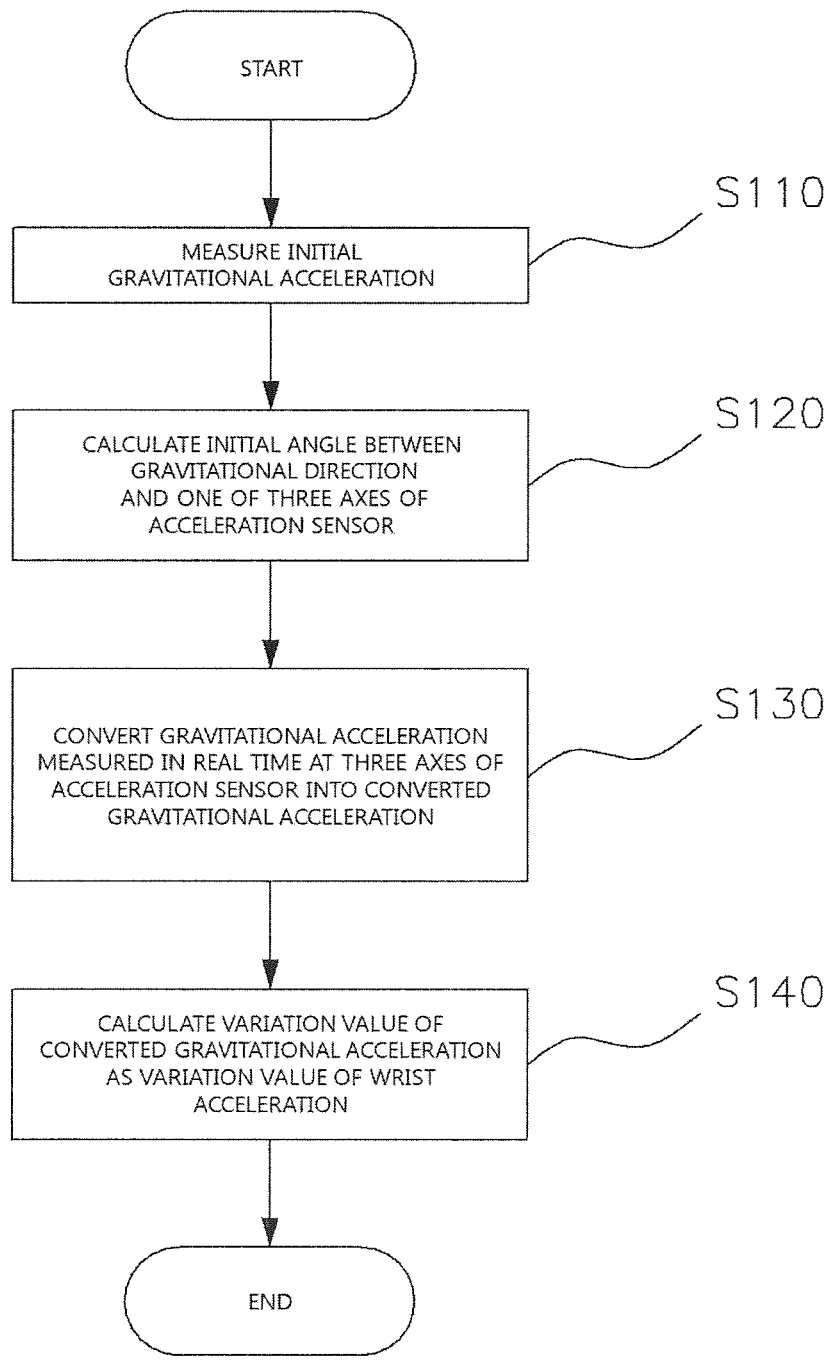
FIG. 5 is a flowchart for explaining a wrist acceleration variation value calculating step in the method of calculating a meal period according to the exemplary embodiment of the present disclosure.

For example, in step S100, the wrist acceleration calculating unit 100 may calculate an initial angle between the x-axis and the gravitational direction in an initial state in which an x-axis direction of the three-axis acceleration sensor (not illustrated) worn on the user's wrist is positioned toward the ground surface, and may calculate the wrist acceleration variation value based on the variation of the calculated initial angle, and a specific method of calculating the wrist acceleration variation value by means of the wrist acceleration calculating unit 100 in the wrist acceleration variation value calculating step S100 will be described below with reference to FIG. 5.

Now, a case in which a modified wrist acceleration variation value is used in step S100 will be described with reference to FIGS. 4 and 7 together.

Figure 7:
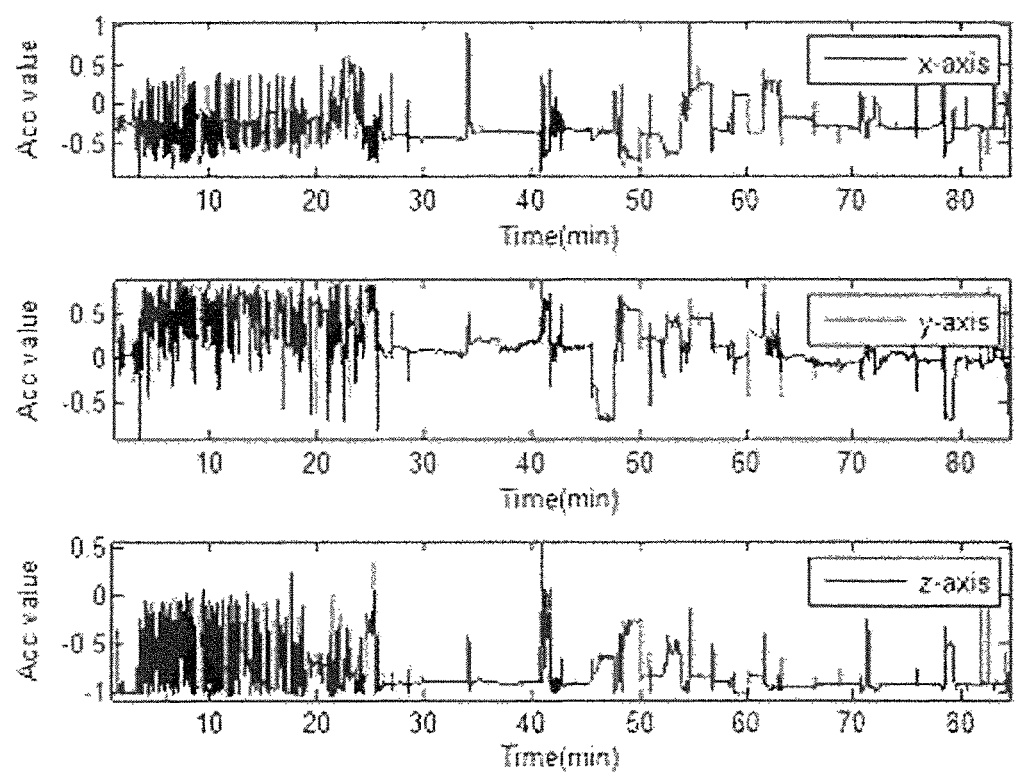
FIG. 7 is a view for explaining a feature in which a modified wrist acceleration variation value is calculated in the wrist acceleration variation value calculating step in the method of calculating a meal period according to the exemplary embodiment of the present disclosure.

FIG. 7 is a view for explaining a feature in which a modified wrist acceleration variation value is calculated in the wrist acceleration variation value calculating step in the method of calculating a meal period according to the exemplary embodiment of the present disclosure.

According to the exemplary embodiment, in step S100, the wrist acceleration calculating unit 100 may calculate the modified wrist acceleration variation value made by modifying a variation value of the acceleration in respect to the motion of the user's wrist which is measured based on the gravitational acceleration by the acceleration sensor (not illustrated).

In this case, the wrist acceleration calculating unit 100 may calculate the modified wrist acceleration variation value by removing a variation value of the acceleration in respect to the motion of the user's wrist which has a period shorter than a preset length among the variation values of the acceleration in respect to the motion of the user's wrist, and in a case in which the wrist acceleration calculating unit 100 calculates the modified wrist acceleration variation value, step S200 may be performed based on the calculated modified wrist acceleration variation value.

In this case, the reason why the wrist acceleration calculating unit 100 calculates the modified wrist acceleration variation value in step S100 is to utilize the modified wrist acceleration variation value made by removing noise from the variation value of the acceleration in respect to the motion of the user's wrist which is measured based on the gravitational acceleration.

In this case, the noise in the variation value of the acceleration in respect to the motion of the user's wrist which is measured based on the gravitational acceleration occurs in a case in which the user wears the apparatus for calculating a meal period according to the exemplary embodiment of the present disclosure and performs other behaviors except for the eating behavior.

In this case, the noise is caused by behaviors such as walking and running having a short period, and in step S100, the wrist acceleration calculating unit 100 may remove the variation value of the acceleration in respect to the motion of the user's wrist which has a period shorter than the preset length in order to calculate the modified wrist acceleration variation value.

According to the exemplary embodiment, in step S100, in order to calculate the modified wrist acceleration variation value, the wrist acceleration calculating unit 100 may remove the variation value of the acceleration in respect to the motion of the user's wrist which has a period shorter than the preset length by applying a low pass filter (LPF) to the variation value of the acceleration in respect to the motion of the user's wrist which is measured with respect to the respective three axes of the acceleration sensor (not illustrated) based on the gravitational acceleration, and a result of applying the low pass filter (LPF) to the variation value of the acceleration in respect to the motion of the user's wrist which is measured with respect to the respective three axes may be shown as acceleration values over time with respect to the x-axis, the y-axis, and the z-axis, as illustrated in FIG. 7.

Now, step S200 will be described with reference to FIGS. 4, 8, and 9 together.

Figure 8:
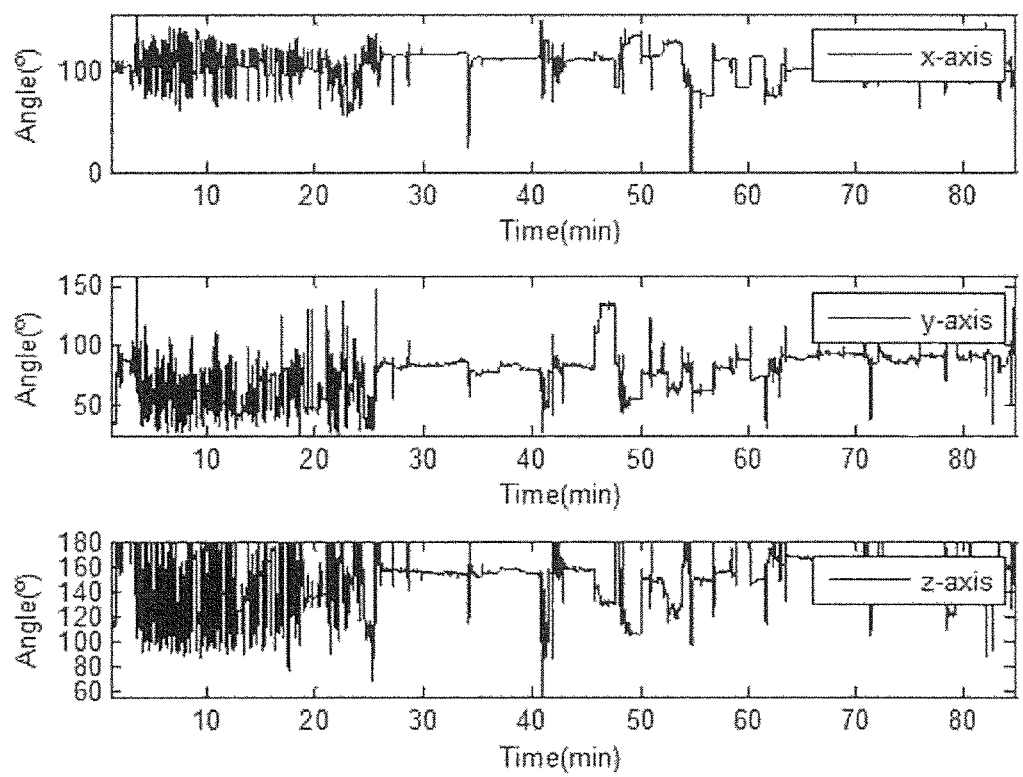
FIG. 8 is a view for explaining the wrist angle variation value calculating step in the method of calculating a meal period according to the exemplary embodiment of the present disclosure.

FIG. 8 is a view for explaining the wrist angle variation value calculating step in the method of calculating a meal period according to the exemplary embodiment of the present disclosure. FIG. 9 is a view for explaining a relationship between the wrist acceleration variation value and the wrist angle variation value in the method of calculating a meal period according to the exemplary embodiment of the present disclosure.

In step S200, the wrist angle calculating unit 200 may calculate the wrist angle variation value, which is a variation value of an angle to the user's wrist, based on the gravitational direction by using the wrist acceleration variation value calculated in step S100.

Figure 9:
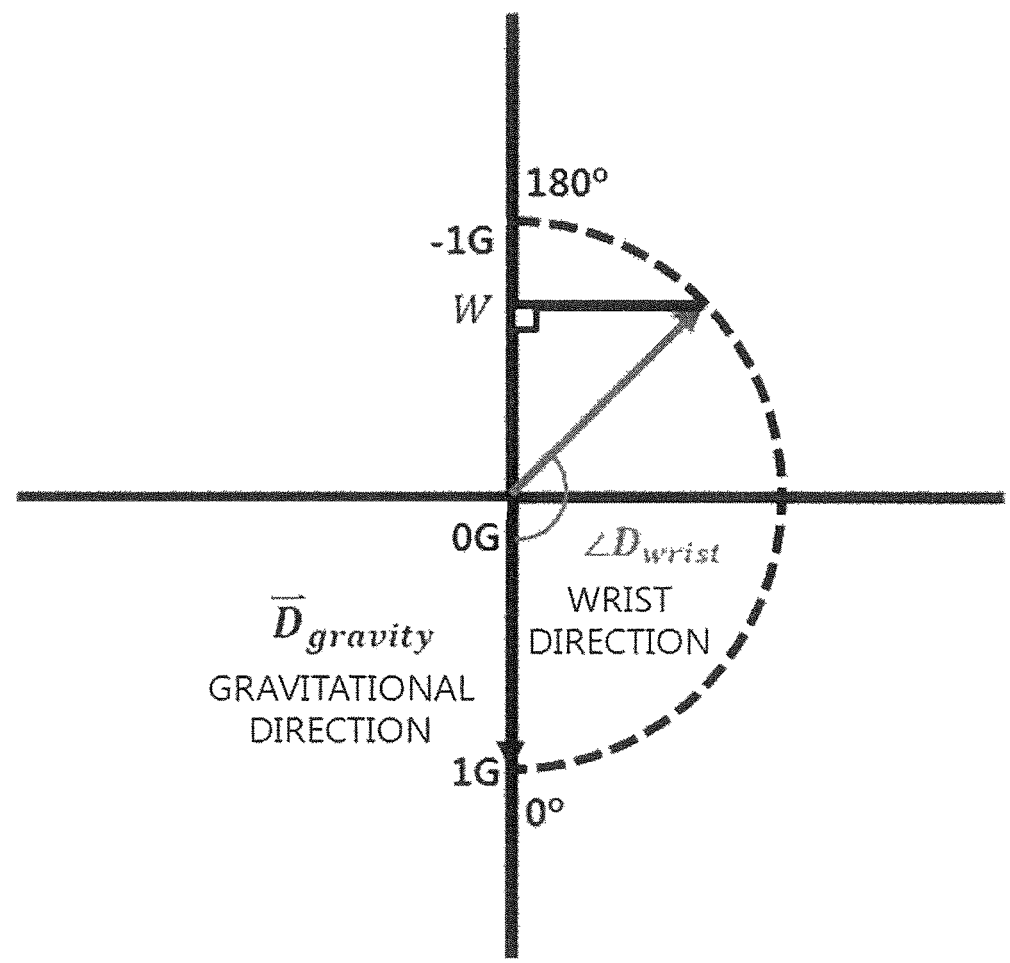
FIG. 9 is a view for explaining a relationship between the wrist acceleration variation value and the wrist angle variation value in the method of calculating a meal period according to the exemplary embodiment of the present disclosure.

As illustrated in FIG. 9, based on the gravitational direction, the wrist acceleration variation value and the wrist angle variation value have a relationship of an inverse function of cosine.

Therefore, in step S200, the wrist angle calculating unit 200 may calculate a normalized wrist acceleration variation value made by normalizing the wrist acceleration variation value, and then may calculate the wrist angle variation value by calculating the inverse function of cosine with respect to the normalized wrist acceleration variation value.

According to the exemplary embodiment, in a case in which the wrist acceleration variation value is measured by the unit of m/s$^2$, in step S200, the wrist angle calculating unit 200 may normalize the wrist acceleration variation value w by dividing the wrist acceleration variation value w by 1G (about 9.8 m/s$^2$) so as to calculate the normalized wrist acceleration variation value, and then calculate an inverse function of cosine with respect to the normalized wrist acceleration variation value, thereby calculating the wrist angle variation value, and a specific method is described by the following Expression 1.

$$\vec{D}_{wrist} = \cos^{-1}\left(\frac{w}{9.8 \text{ m/s}^2}\right) \quad \text{[Expression 1]}$$

Here, $\vec{D}_{wrist}$ is a wrist angle variation value, and w is a wrist acceleration variation value.

According to the exemplary embodiment, the acceleration sensor (not illustrated), which is implemented as a digital system, may measure acceleration in accordance with preset resolution, and in a case in which resolution of the acceleration sensor (not illustrated) is Res, in step S200, the wrist angle calculating unit 200 may normalize the wrist acceleration variation value W by dividing the wrist acceleration variation value W by an output value $2^{Res}/R$ when gravitational acceleration of the corresponding acceleration sensor (not illustrated) is 1G so as to calculate the normalized wrist acceleration variation value, and then calculate the wrist angle variation value by calculating the inverse function of cosine with respect to the normalized wrist acceleration variation value.

Here, the output value $2^{Res}/R$, when the gravitational acceleration of the corresponding acceleration sensor (not illustrated) is 1G, may be calculated by using the resolution Res of the acceleration sensor (not illustrated) and a magnitude R of a measuring range of the acceleration sensor.

For example, in a case in which the resolution of the acceleration sensor (not illustrated) is 10 bit and the measuring range of the acceleration sensor (not illustrated) is −8 g to 8 g, a magnitude of the measuring range of the acceleration sensor (not illustrated) may be 16 g, and the output value $2^{Res}/R$, when the gravitational acceleration of the corresponding acceleration sensor (not illustrated) is 1G, may be $2^{10}/16$, that is, 64.

In this case, a specific method of calculating the wrist angle variation value is described by the following Expression 2.

$$\vec{D}_{wrist} = \cos^{-1}\left(\frac{W}{2^{Res}/R}\right) \quad \text{[Expression 2]}$$

In this case, $\vec{D}_{wrist}$ is a wrist angle variation value, w is a wrist acceleration variation value, Res is resolution of the acceleration sensor, and R is a magnitude of a measuring range of the acceleration sensor.

According to the exemplary embodiment, in a case in which the wrist acceleration variation value is measured by the unit of m/s$^2$, in step S200, the wrist angle calculating unit 200 may calculate the normalized wrist acceleration variation value by using initial gravitational acceleration $x_{ini}$, $y_{ini}$, and $z_{ini}$, instead of normalizing the wrist acceleration variation value w by dividing the wrist acceleration variation value w by 1G (about 9.8 m/s$^2$), and then calculate the inverse function of cosine with respect to the normalized wrist acceleration variation value, thereby calculating the wrist angle variation value, and a specific method is described by the following Expression 3.

$$\vec{D}_{wrist} = \cos^{-1}\left(\frac{W}{\sqrt{x_{ini}^2 + y_{ini}^2 + z_{ini}^2}}\right) \quad \text{[Expression 3]}$$

In this case, $\vec{D}_{wrist}$ is a wrist angle variation value, w is a wrist acceleration variation value, $x_{ini}$ is initial gravitational acceleration in an x-axis direction, $y_{ini}$ is initial gravitational acceleration in a y-axis direction, and $z_{ini}$ is initial gravitational acceleration in a z-axis direction.

Now, the reason why the wrist angle calculating unit 200 calculates the normalized wrist acceleration variation value made by normalizing the wrist acceleration variation value in step S200 will be described.

In a case in which there is no motion acceleration, as illustrated in FIG. 9, the wrist angle variation value and the wrist acceleration variation value have a relationship of the inverse function of cosine, and a domain of the inverse function of cosine is [−1, 1], such that it is necessary to adjust a unit of the wrist acceleration variation value having an acceleration unit (m/s$^2$) in order to obtain the inverse function of cosine of the wrist acceleration variation value, and as a result, in step S200, the wrist angle calculating unit 200 may calculate the normalized wrist acceleration variation value by utilizing Expression 1 to Expression 3.

Meanwhile, in a case in which during a process of applying Expression 1 to Expression 3, a motion acceleration component is measured by the acceleration sensor and the wrist acceleration has a value exceeding [−1G, 1G], the wrist angle calculating unit 200 may calculate a wrist angle by considering −1G as a minimum value, and 1G as a maximum value.

In step S200, as illustrated in FIG. 8, the wrist angle variation value calculated by the wrist angle calculating unit 200 may be shown as angle values over time with respect to the x-axis, the y-axis, and the z-axis.

Now, step S300 will be described with reference to FIGS. 4, 10, and 11 together.

Figure 10:
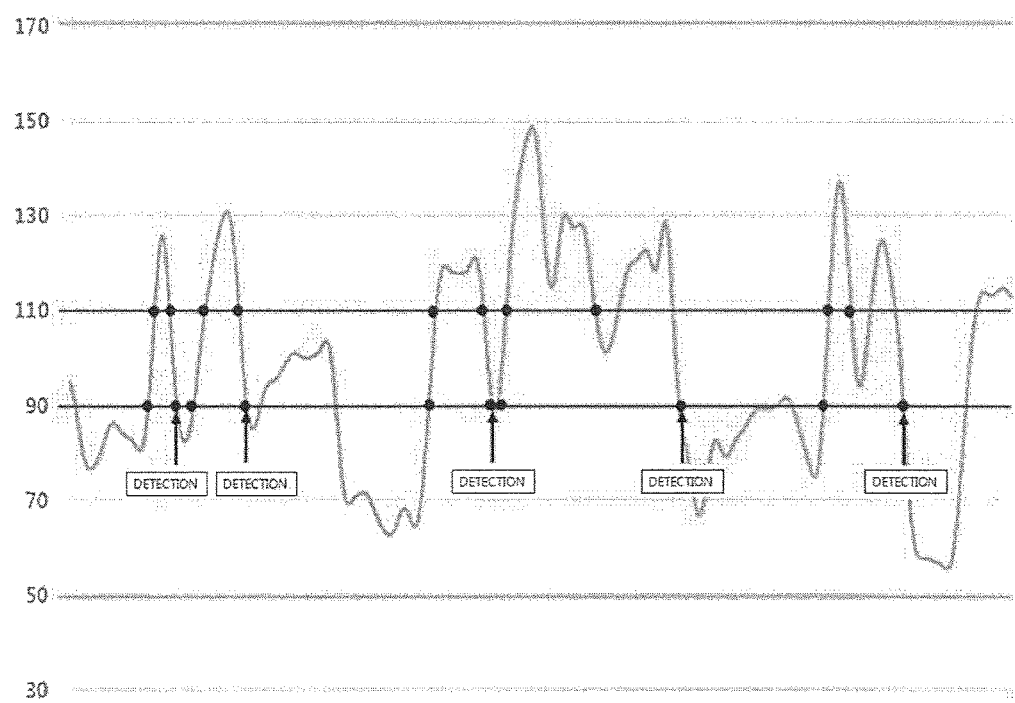
FIG. 10 is a view for explaining an eating behavior candidate pattern detecting step in the method of calculating a meal period according to the exemplary embodiment of the present disclosure.
Figure 11:
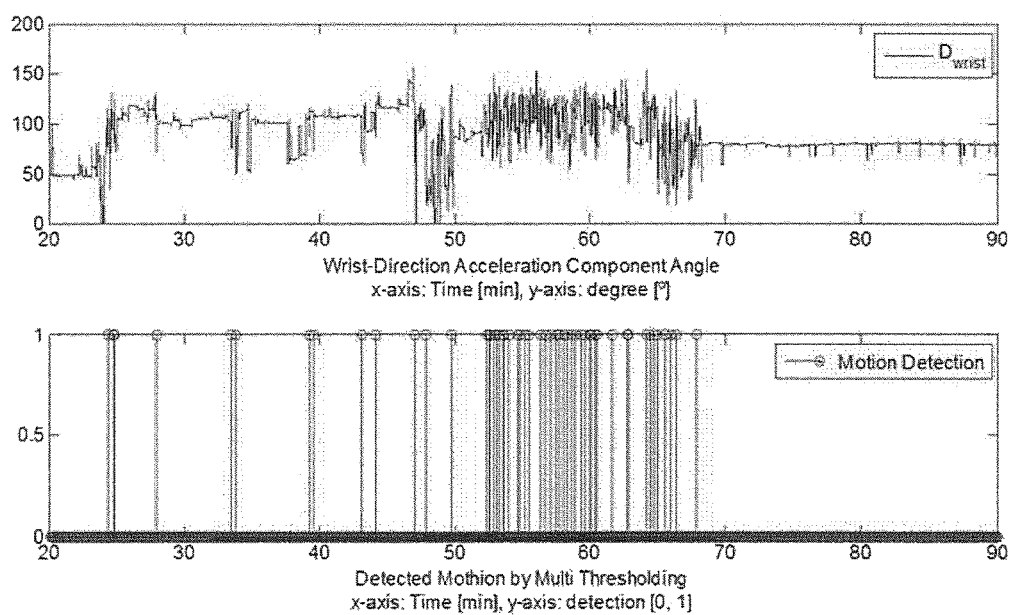
FIG. 11 is a view for explaining the eating behavior candidate pattern detecting step in the method of calculating a meal period according to the exemplary embodiment of the present disclosure.

FIGS. 10 and 11 are views for explaining an eating behavior candidate pattern detecting step in the method of calculating a meal period according to the exemplary embodiment of the present disclosure.

In step S300, the eating behavior candidate pattern detecting unit 300 detects an eating behavior candidate pattern based on a predetermined reference by applying one or more threshold values to the wrist angle variation value.

As illustrated in FIG. 10, in step S300, one or more threshold values, which are applied to the wrist angle variation value by the eating behavior candidate pattern detecting unit 300, include a first threshold value, and a second threshold value which is an angle value greater than the first threshold value, and the eating behavior candidate pattern detecting unit 300 may detect the eating behavior candidate pattern by detecting a pattern in which the wrist angle variation value starts with an angle value smaller than the first threshold value and increases to an angle value greater than the second threshold value, and the wrist angle variation value starts with an angle value greater than the second threshold value and decreases to an angle value smaller than the first threshold value.

As illustrated in FIG. 10, for example, step S300 will be described on the assumption that the first threshold value is 90 degrees and the second threshold value is 110 degrees.

In this case, the eating behavior candidate pattern detecting unit 300 may use an angle value over time with respect to the x-axis of the wrist angle variation value which is not affected by a rotation of the wrist and measures only a change in angle of the wrist based on the gravitational direction among the wrist angle variation values calculated by the wrist angle calculating unit 200.

The eating behavior candidate pattern detecting unit 300 may detect the eating behavior candidate pattern by detecting a pattern in which over time, the wrist angle variation value with respect to the x-axis starts with an angle value smaller than 90 degrees, that is, the first threshold value, and increases to an angle value greater than 90 degrees, that is, the first threshold value, and the wrist angle variation value with respect to the x-axis increases from an angle value greater than 90 degrees, that is, the first threshold value to an angle value greater than 110 degrees, that is, the second threshold value, decreases from an angle value greater than 110 degrees, that is, the second threshold value to an angle value smaller than 110 degrees, that is, the second threshold value, and then decreases from an angle value smaller than 110 degrees, that is, the second threshold value to an angle value smaller than 90 degrees, that is, the first threshold value.

Furthermore, the eating behavior candidate pattern detecting unit 300 may detect a plurality of eating behavior candidate patterns among the wrist angle variation values with respect to the x-axis by repeating the aforementioned processes.

In other words, in step S300, the eating behavior candidate pattern detecting unit 300 may detect a single eating behavior candidate pattern by detecting a pattern in which the wrist angle variation value increases sequentially passes through the first threshold value and the second threshold value, and then decreases sequentially passes through the second threshold value and the first threshold value.

Meanwhile, in step S300, the eating behavior candidate pattern detecting unit 300 may determine that a pattern, in which the wrist angle variation value increases by passing through the first threshold value, but decreases without passing through the second threshold value, and then decreases again by passing through the first threshold value, as indicated by a third peak from the left side in FIG. 10, is not the eating behavior candidate pattern.

According to the exemplary embodiment, the eating behavior candidate pattern detected in step S300 may have an angle value between a minimum limit value, which is an angle value smaller than the first threshold value, and a maximum limit value which is an angle value greater than the second threshold value.

As illustrated in FIG. 10, the eating behavior candidate pattern detecting unit 300 may apply a maximum limit value of 170 degrees and a minimum limit value of 50 degrees in order to detect the eating behavior candidate pattern.

In other words, the plurality of eating behavior candidate patterns detected by the eating behavior candidate pattern detecting unit 300 may be set to be in a range from 50 degrees to 170 degrees, respectively.

According to the exemplary embodiment, in step S300, in a case in which the wrist angle variation value becomes smaller than the minimum limit value, the eating behavior candidate pattern detecting unit 300 may determine that the next behavior is not the eating behavior.

For example, in step S300, in a case in which the wrist angle variation value becomes greater than the maximum limit value, the eating behavior candidate pattern detecting unit 300 may determine that the corresponding motion of the user's wrist is not the eating behavior.

The plurality of eating behavior candidate patterns, which is detected by the eating behavior candidate pattern detecting unit 300 in step S300, may be illustrated in a lower graph in FIG. 11.

Step S300 will be described with reference to FIG. 11. The eating behavior candidate pattern detecting unit 300 may detect the plurality of eating behavior candidate patterns which satisfy the threshold value condition as illustrated in the lower graph in FIG. 11 from the wrist angle variation value as illustrated in an upper graph in FIG. 11.

Now, step S400 will be described with reference to FIG. 4.

In step S400, the meal period calculating unit 400 may calculate the meal period based on the number of times the eating behavior candidate pattern occurs which is calculated in step S300.

In this case, since the eating behavior candidate pattern is calculated by using the angle variation value of the user's wrist, some of the plurality of calculated eating behavior candidate patterns may be generated by other behaviors except for the eating behavior.

Therefore, in step S400, the meal period calculating unit 400 may calculate the meal period by defining a case in which the eating behavior candidate pattern occurs a preset number of times or more for a preset time as a partial eating behavior which is a part of the overall eating behavior of the user.

For example, the meal period calculating unit 400 may detect a case in which the eating behavior candidate patterns are detected seven or more times for three minutes as the partial eating behavior, and a specific operation will be described below with reference to FIG. 13.

Now, a specific method of calculating the wrist acceleration variation value by means of the wrist acceleration calculating unit 100 in step S100 will be described with reference to FIGS. 5 and 6 together.

FIG. 5 is a flowchart for explaining a wrist acceleration variation value calculating step in the method of calculating a meal period according to the exemplary embodiment of the present disclosure.

As illustrated in FIG. 5, step S100 includes step S110 of measuring initial gravitational acceleration, step S120 of calculating an initial angle between one of the three axes of the acceleration sensor and the gravitational direction, step S130 of converting gravitational acceleration, which is measured in real time at the respective three axes of the acceleration sensor, into converted gravitational acceleration, and step S140 of calculating a variation value of wrist acceleration based on a variation value of the converted gravitational acceleration.

According to the exemplary embodiment, the acceleration in respect to the motion of the user's wrist may be measured by using the three-axis acceleration sensor (not illustrated).

In step S110, the wrist acceleration calculating unit 100 may measure the initial gravitational acceleration with respect to the respective three axes of the acceleration sensor (not illustrated) in an initial state in which one of the three axes of the acceleration sensor (not illustrated) is positioned toward the ground surface.

In step S120, the wrist acceleration calculating unit 100 may calculate an initial angle between the gravitational direction and one of the three axes of the acceleration sensor by using the measured initial gravitational acceleration with respect to the respective three axes of the acceleration sensor (not illustrated).

In step S130, by using the calculated initial angle, the wrist acceleration calculating unit 100 may convert the gravitational acceleration, which is measured in real time at the respective three axes of the acceleration sensor (not illustrated), into the converted gravitational acceleration which is gravitational acceleration with respect to the three gravitational axes which are three axes defined by using the gravitational direction as a reference axis.

In step S140, the wrist acceleration calculating unit 100 may calculate the wrist acceleration variation value based on a variation value of converted gravitational acceleration corresponding to a reference axis that varies in accordance with the motion of the user's wrist.

According to the exemplary embodiment, in step S110, the wrist acceleration calculating unit 100 may measure the initial gravitational acceleration with respect to the respective three axes by utilizing the acceleration sensor (not illustrated) in an initial state in which one of the three sensor axes, which are the three axes of the acceleration sensor (not illustrated), is positioned toward the ground surface.

For example, in step S110, the wrist acceleration calculating unit 100 may measure the initial gravitational acceleration $x_{ini}$, $y_{ini}$, and $z_{ini}$ with respect to the three axes in an initial state in which the x-axis direction of the three-axis acceleration sensor (not illustrated) worn on the user's wrist is positioned toward the ground surface.

In another exemplary embodiment, in step S110, the wrist acceleration calculating unit 100 may read the initial gravitational acceleration $x_{ini}$, $y_{ini}$, and $z_{ini}$ with respect to the three axes, which is measured and stored in advance in the initial state in which one of the three sensor axes, which are the three axes of the acceleration sensor (not illustrated), is positioned toward the ground surface, instead of obtaining the initial gravitational acceleration by measuring the initial gravitational acceleration.

In step S120, the wrist acceleration calculating unit 100 may calculate the initial angle between the gravitational direction and one of the three sensor axes by using the measured initial gravitational acceleration with respect to the respective three axes.

More specifically, the wrist acceleration calculating unit 100 may calculate initial angles θ and ρ by using the inverse function of sine as described by the following Expression 4 in a case in which the initial angle between the x-axis and the gravitational direction is calculated in the initial state in which the x-axis direction of the three-axis acceleration sensor worn on the user's wrist is positioned toward the ground surface.

$$\theta = \sin^{-1}\left(\frac{x_{ini}}{\sqrt{x_{ini}^2 + y_{ini}^2}}\right)$$

$$\rho = \sin^{-1}\left(\frac{y_{ini}}{\sqrt{x_{ini}^2 + y_{ini}^2 + z_{ini}^2}}\right)$$ [Expression 4]

In this case, θ is a horizontal direction angle in a Cartesian coordinate system, ρ is a vertical direction angle in the Cartesian coordinate system, $x_{ini}$ is initial gravitational acceleration in the x-axis direction, $y_{ini}$ is initial gravitational acceleration in the y-axis direction, and $z_{ini}$ is initial gravitational acceleration in the z-axis direction.

In another exemplary embodiment, in a case in which the apparatus for calculating a meal period according to the exemplary embodiment of the present disclosure reads the initial gravitational acceleration stored in the apparatus for calculating a meal period, the apparatus for calculating a meal period may calculate the initial angle between the gravitational direction and one of the three sensor axes by using the read initial gravitational acceleration with respect to the three axes.

The reason why the initial angle between the gravitational direction and one of the three axes of the acceleration sensor (not illustrated) is calculated in step S120 as described above is to detect the motion of the user's wrist based on the gravitational direction, and in a case in which the initial angle based on the gravitational direction is not used, it is impossible to distinguish an operation of moving the wrist within a preset angle range for a meal from an operation of straightening the user's wrist toward a front side of the body and bending the wrist.

In addition, in a case in which the apparatus for calculating a meal period according to the exemplary embodiment of the present disclosure may be worn without distinguishing the left and right sides, it is possible to accurately detect the overall eating behavior of the user by calculating and utilizing the initial angle between the gravitational direction and one axis of the acceleration sensor (not illustrated).

In step S130, by using the calculated initial angle, the wrist acceleration calculating unit 100 may convert the gravitational acceleration, which is measured in real time at the respective three sensor axes, into the converted gravitational acceleration which is gravitational acceleration with respect to the three gravitational axes which are three axes defined by using the gravitational direction as a reference axis.

More specifically, the wrist acceleration calculating unit 100 may convert gravitational acceleration X, Y, and Z, which is measured in real time by the three-axis acceleration sensor, into converted gravitational acceleration X†, Y†, and Z† by using the initial angles θ and ρ as described by the following Expression 5.

$$\begin{bmatrix} \cos\theta & 0 & -\sin\theta \\ -\sin\theta\sin\rho & \cos\rho & -\cos\theta\sin\rho \\ \sin\theta\cos\rho & \sin\rho & \cos\theta\sin\rho \end{bmatrix} \begin{bmatrix} X \\ Y \\ Z \end{bmatrix} = \begin{bmatrix} X^\dagger \\ Y^\dagger \\ Z^\dagger \end{bmatrix}$$ [Expression 5]

In this case, Z† is converted gravitational acceleration corresponding to the reference axis according to the gravitational direction, X† and Y† are converted gravitational acceleration with respect to the axes orthogonal to Z†, θ is a horizontal direction angle in the Cartesian coordinate system, and ρ is a vertical direction angle in the Cartesian coordinate system.

Now, a relationship between the gravitational acceleration X, Y, and Z and the converted gravitational acceleration X\, Y\, and Z† will be described with reference to FIGS. 5, 6A, and 6B together.

Figure 6A:
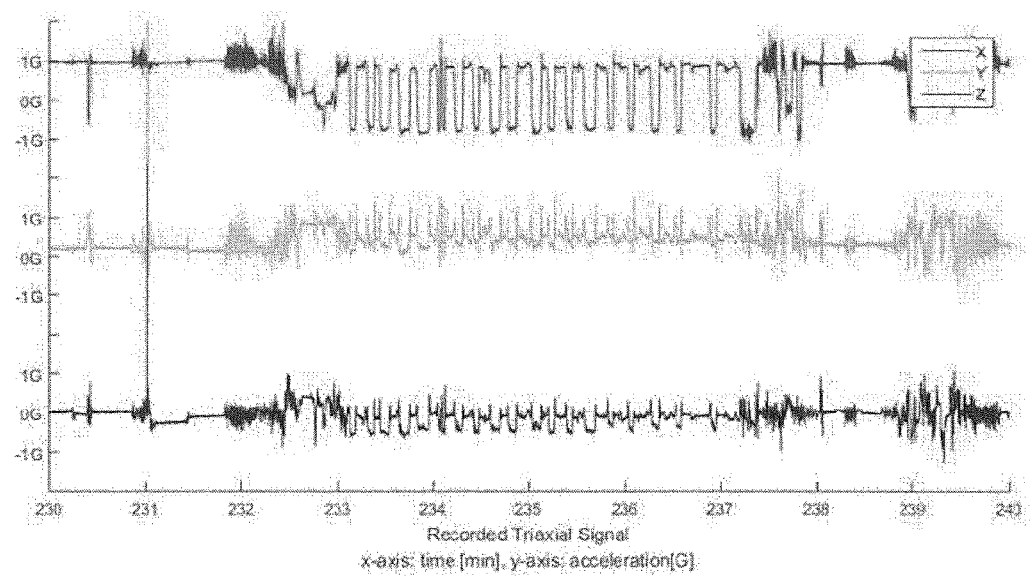
FIGS. 6A and 6B are views for explaining gravitational acceleration, and gravitational acceleration with respect to three axes of gravity in the method of calculating a meal period according to the exemplary embodiment of the present disclosure.
Figure 6B:
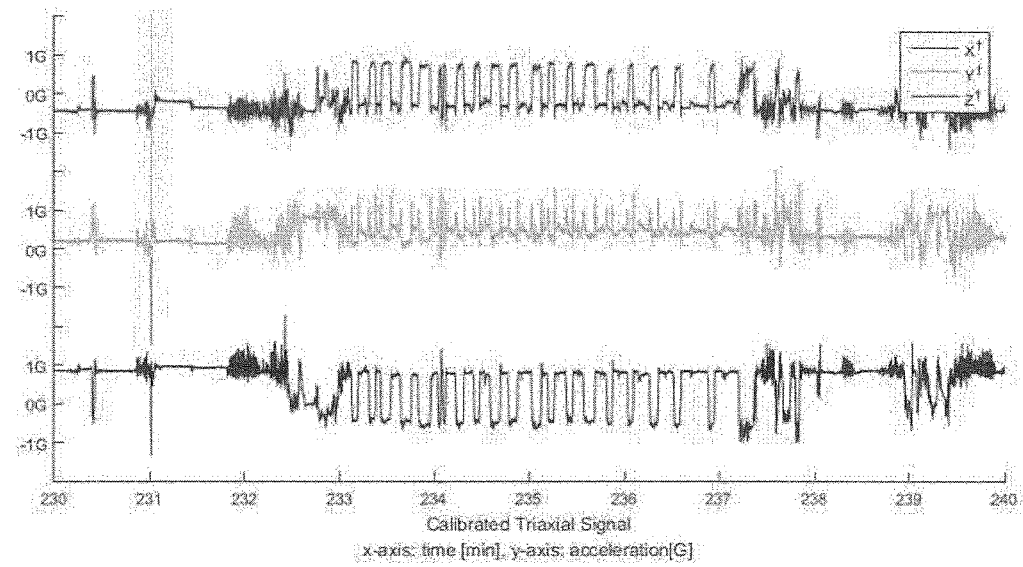

FIGS. 6A and 6B are views for explaining the gravitational acceleration, and the gravitational acceleration with respect to the three gravitational axes in the method of calculating a meal period according to the exemplary embodiment of the present disclosure.

FIG. 6A is a view illustrating the gravitational acceleration with respect to the three sensor axes which illustrates the gravitational acceleration X, Y, and Z measured by the three-axis acceleration sensor (not illustrated), in which a horizontal axis indicates a time axis using the minute (min) as a unit, and a vertical axis indicates magnitudes of the gravitational acceleration using G as a unit. The wrist acceleration calculating unit 100 may convert the gravitational acceleration X, Y, and Z with respect to the three axes of the acceleration sensor, which is measured as described above, into the converted gravitational acceleration X\, Y\, and Z† by combining the gravitational acceleration X, Y, and Z by means of Expression 5.

FIG. 6B is a view illustrating the gravitational acceleration with respect to the three gravitational axes, which illustrates the converted gravitational acceleration X\, Y\, and Z† which converted and calculated from the measured gravitational acceleration X, Y, and Z.

Here, the gravitational acceleration corresponding to the gravitational direction may be Z†, the gravitational acceleration corresponding to the left and right direction orthogonal to the gravitational direction may be X\, and the gravitational acceleration corresponding to the remaining direction orthogonal to all of the gravitational direction and the left and right direction may be Y\.

In step S140, the wrist acceleration calculating unit 100 may calculate the wrist acceleration variation value based on a variation value of converted gravitational acceleration corresponding to the reference axis that varies in accordance with the motion of the user's wrist.

For example, the wrist acceleration calculating unit 100 may define at least one of the converted gravitational acceleration X\, Y\, and Z† as the wrist acceleration W which is the gravitational acceleration applied to the wrist, and may calculate a variation value of at least one of the converted gravitational accelerations X\, Y\, and Z† as a variation value of the wrist acceleration W.

Now, step S400 will be described in detail with reference to FIGS. 12 and 13 together.

Figure 12:
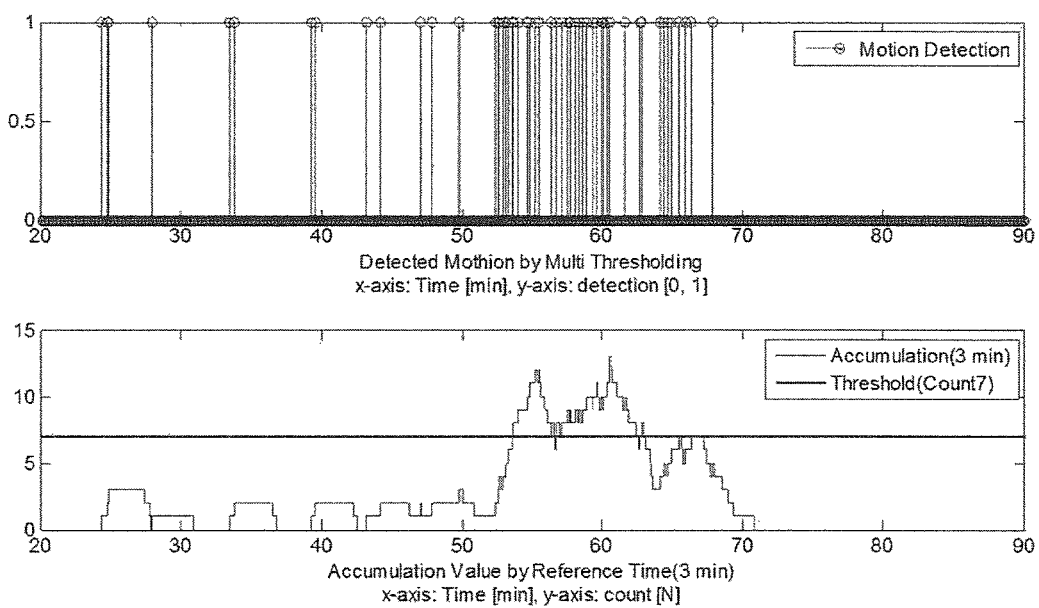
FIG. 12 is a view for explaining a meal period calculating step in the method of calculating a meal period according to the exemplary embodiment of the present disclosure.

FIG. 12 is a view for explaining the meal period calculating step in the method of calculating a meal period according to the exemplary embodiment of the present disclosure. FIG. 13 is a flowchart for explaining the meal period calculating step in the method of calculating a meal period according to the exemplary embodiment of the present disclosure.

Figure 13:
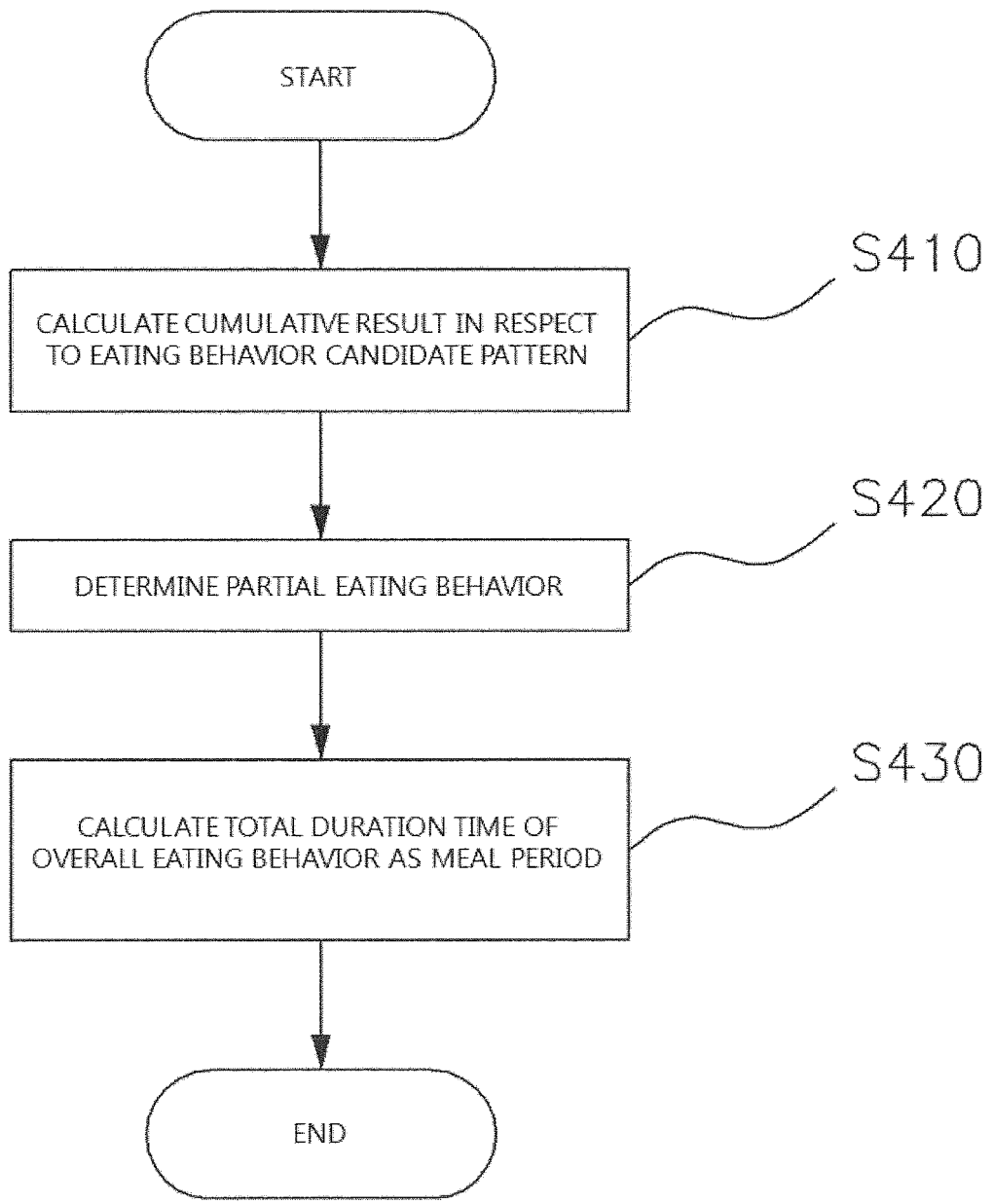
FIG. 13 is a flowchart for explaining the meal period calculating step in the method of calculating a meal period according to the exemplary embodiment of the present disclosure.

Referring to FIG. 13, step S400 includes step S410 of calculating a cumulative result in respect to the eating behavior candidate pattern, step S420 of defining a partial eating behavior, and step S430 of calculating a total duration time of the overall eating behavior as the meal period.

In more detail, in step S410, the meal period calculating unit 400 may calculate the cumulative result in respect to the eating behavior candidate pattern by accumulating the number of times the eating behavior candidate pattern occurs which is detected in step S300.

Thereafter, in step S420, the meal period calculating unit 400 may define a case in which the eating behavior candidate pattern occurs a preset number of times or more for a preset time based on the cumulative result as the partial eating behavior which is a part of the overall eating behavior of the user.

For example, in a graph of the cumulative result made by accumulating the number of times the eating behavior candidate pattern occurs as illustrated in an upper graph in FIG. 12, the meal period calculating unit 400 may calculate the number of times the eating behavior candidate pattern occurs for three minutes as indicated by cumulative values (Accumulation (3 min)) in a lower graph in FIG. 12, and then may calculate points at which the calculated number of times the eating behavior candidate pattern occurs for three minutes exceeds seven as indicated by threshold values (Threshold (Count 7)) in the lower graph in FIG. 12.

For example, the meal period calculating unit 400 may calculate the cumulative result by accumulating the number of times the wrist motion occurs for recently three minutes before a particular point in time, and may define the case in which the cumulative number is seven or more for recently three minutes as the eating behavior.

In other words, the meal period calculating unit 400 may calculate the respective points at which the number of times the eating behavior candidate pattern occurs for a preset time exceeds the preset number, and may define the respective calculated points as the partial eating behavior.

Thereafter, in step S430, the meal period calculating unit 400 may determine the overall eating behavior including the determined partial eating behavior of the user, and may define the total duration time of the overall eating behavior as the meal period.

For example, the meal period calculating unit 400 may determine the overall eating behavior by combining the respective points at which the cumulative values (Accumulation (3 min)) in the lower graph in FIG. 12 exceed the threshold value (Threshold (Count7)), and may calculate the total duration time of the overall eating behavior as the meal period.

According to the exemplary embodiment, the overall eating behavior may be shown at continuous points at which the cumulative values (Accumulation (3 min)) in the lower graph in FIG. 12 exceed the threshold value (Threshold (Count7)), and the total duration time of the continuous points may be calculated as the meal period.

In other words, the respective points at which the cumulative values (Accumulation (3 min)) in the lower graph in FIG. 12 exceed the threshold value (Threshold (Count7)) may be the partial eating behavior, the continuous points at which the cumulative values (Accumulation (3 min)) exceed the threshold value (Threshold (Count7)) may be the overall eating behavior, and the meal period calculating unit 400 may calculate the total duration time of the overall eating behavior as the meal period.

According to yet another exemplary embodiment of the present disclosure, in step S430, the meal period calculating unit 400 may calculate a corrected meal period by further adding a preset time before an initial detection point in time of the overall eating behavior into the calculated meal period.

In this case, the reason why the corrected meal period is calculated is that there may be a case in which an interval between the wrist motions is long for various reasons such as when the user has a chat or thinks about something during a meal.

Therefore, the method and the apparatus for calculating a meal period according to the exemplary embodiment of the present disclosure may further add a preset time before the initial detection point in time of the overall eating behavior into the calculated meal period in order to include an interval between the wrist motions in the meal period even though the interval is long.

In this case, the preset time before the initial detection point in time of the overall eating behavior may be two minutes.

For example, in step S430, the meal period calculating unit 400 may use a dilation technique in order to calculate the corrected meal period.

In this case, the dilation technique may mean a technique of further adding the preset time before the initial detection point in time of the overall eating behavior into the calculated meal period.

According to yet another exemplary embodiment of the present disclosure, in step S430, the meal period calculating unit 400 may define only a case in which the calculated meal period is longer than the preset time as the meal period.

The reason is that the meal period is continued for a predetermined time, and for example, the meal period calculating unit 400 may define only a case in which the calculated meal period is longer than ten minutes as the meal period.

Figure 14A:
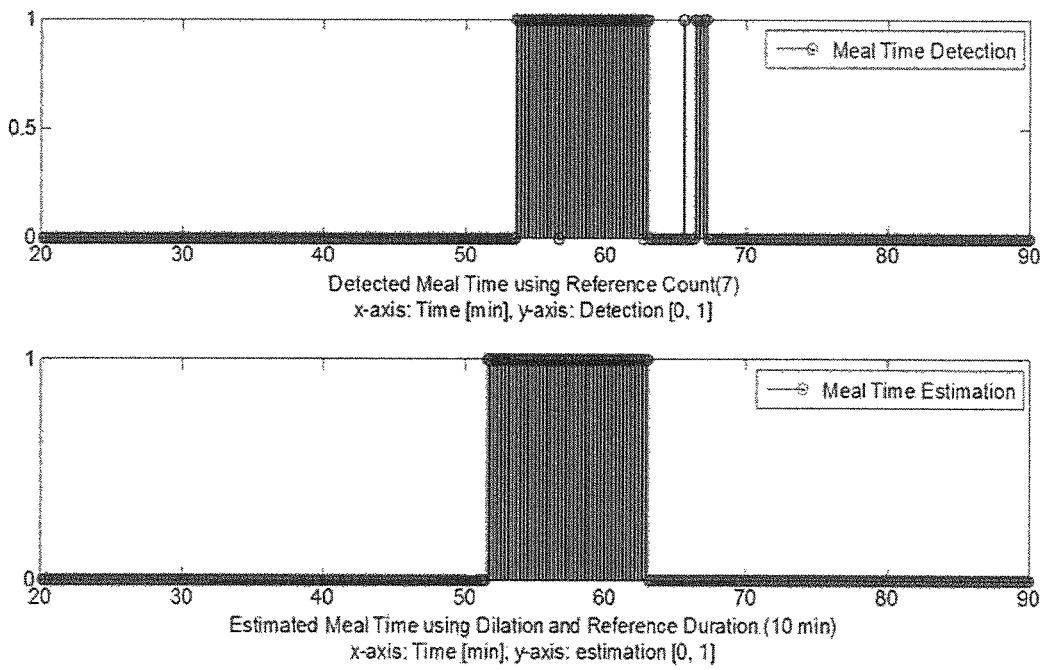
FIGS. 14A and 14B are views for explaining a meal period calculated by the method and the apparatus for calculating a meal period according to the exemplary embodiment of the present disclosure.
Figure 14B:
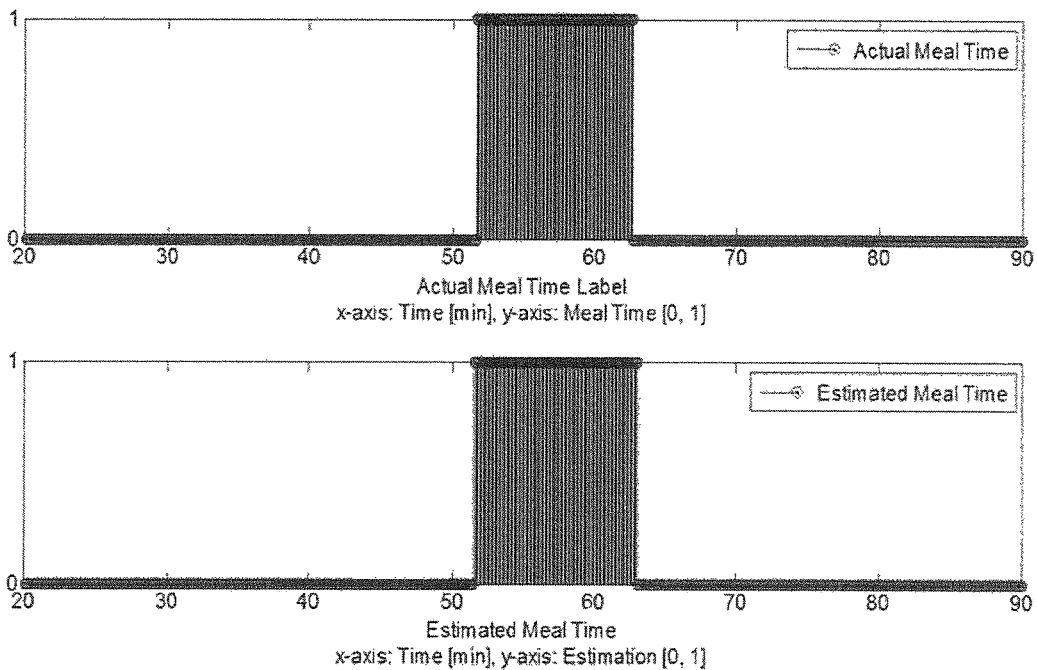

FIGS. 14A and 14B are views for explaining the meal period calculated by the method and the apparatus for calculating a meal period according to the exemplary embodiment of the present disclosure.

The meal period calculated in step S430 may be shown in an upper graph in FIG. 14A, and the meal period is shown in a lower graph in FIG. 14A when applying an algorithm for defining only a case in which the meal period calculated in step S430 and the meal period calculated by the dilation technique are longer than a preset time as the meal period.

Referring to FIG. 14B, it can be seen that an actual meal period shown in an upper graph in FIG. 14B and the calculated meal period shown in a lower graph in FIG. 14B show the similar result.

FIG. 15 is a view for explaining accuracy of meal period calculation by the method and the apparatus for calculating a meal period according to the exemplary embodiment of the present disclosure.

As illustrated in FIG. 15, it can be seen that accuracy is high in a case in which the method and the apparatus for calculating a meal period according to the exemplary embodiment of the present disclosure are utilized.

While the exemplary embodiments according to the present disclosure have been described above, it will be understood by those skilled in the art that the exemplary embodiments may be modified in various forms, and various variants and modifications may be implemented without departing from the claims of the present disclosure.

What is claimed is:

1. A method of calculating a meal period, the method comprising:
   calculating, by a wrist acceleration calculating unit, a wrist acceleration variation value which is a variation value of acceleration in respect to a motion of a user's wrist which is measured based on gravitational acceleration;
   calculating, by a wrist angle calculating unit, a wrist angle variation value which is a variation value of an angle to the user's wrist based on a gravitational direction by using the wrist acceleration variation value;
   detecting, by an eating behavior candidate pattern detecting unit, an eating behavior candidate pattern based on a predetermined reference by applying one or more threshold values to the wrist angle variation value; and
   calculating, by a meal period calculating unit, a meal period based on the number of times the eating behavior candidate pattern occurs,
   wherein in the detecting of the eating behavior candidate pattern, the one or more threshold values include a first threshold value, and a second threshold value which is an angle value greater than the first threshold value, and the eating behavior candidate pattern detecting unit detects the eating behavior candidate pattern by detecting a pattern in which the wrist angle variation value starts with an angle value smaller than the first threshold value and increases to an angle value greater than the second threshold value, and then the wrist angle variation value starts with an angle value greater than the second threshold value and decreases to an angle value smaller than the first threshold value,
   wherein the calculating of the meal period includes:
   calculating, by the meal period calculating unit, a cumulative result in respect to the eating behavior candidate pattern by accumulating the number of times the eating behavior candidate pattern occurs;
   defining, by the meal period calculating unit, a case, in which the eating behavior candidate pattern occurs a preset number of times or more for a preset time based on the cumulative result, as a partial eating behavior which is a part of an overall eating behavior of the user; and
   determining, by the meal period calculating unit, the overall eating behavior including the determined partial eating behavior of the user, and calculating a total duration time of the overall eating behavior as the meal period;
   wherein the eating behavior candidate pattern has an angle value between a minimum limit value, which is an angle value smaller than the first threshold value, and a maximum limit value which is an angle value greater than the second threshold value, and
   wherein when the wrist angle variation value is smaller than the minimum limit value or when the wrist angle variation is greater than the maximum limit value, next behavior following a behavior associated with the wrist angle variation value is excluded at the eating behavior candidate pattern.

2. The method according to claim 1, wherein the acceleration in respect to the motion of the user's wrist is measured by using a three-axis acceleration sensor, and the calculating of the wrist acceleration variation value includes:
   measuring, by the wrist acceleration calculating unit, initial gravitational acceleration with respect to three axes of the acceleration sensor in an initial state in which one of the three axes of the acceleration sensor is positioned toward a ground surface;
   calculating, by the wrist acceleration calculating unit, an initial angle between the gravitational direction and one of the three axes of the acceleration sensor by using the measured initial gravitational acceleration with respect to the three axes of the acceleration sensor;
   converting, by the wrist acceleration calculating unit, by using the calculated initial angle, the gravitational acceleration, which is measured in real time at the three axes of the acceleration sensor, into converted gravitational acceleration which is gravitational acceleration with respect to three gravitational axes that are three axes using the gravitational direction as a reference axis; and
   calculating, by the wrist acceleration calculating unit, a variation value of the converted gravitational acceleration corresponding to the reference axis which varies in accordance with the motion of the user's wrist, as the wrist acceleration variation value.

3. The method according to claim 1, wherein the calculating of the wrist acceleration variation value further includes calculating, by the wrist acceleration calculating unit, a modified wrist acceleration variation value by removing a variation value of the acceleration in respect to the motion of the user's wrist which has a period shorter than a preset length among the variation values of the acceleration in respect to the motion of the user's wrist, and the calculating of the wrist angle variation value is performed based on the modified wrist acceleration variation value.

4. The method according to claim 3, wherein the wrist acceleration calculating unit removes a variation value of the acceleration in respect to the motion of the user's wrist which has a period shorter than the preset length by using a low pass filter (LPF).

5. The method according to claim 1, wherein in the calculating of the wrist angle variation value, the wrist angle calculating unit calculates a normalized wrist acceleration variation value by normalizing the wrist acceleration variation value, and then calculates the wrist angle variation value by calculating an inverse function of cosine with respect to the normalized wrist acceleration variation value.

6. The method according to claim 1, wherein in the calculating of the meal period, the meal period calculating unit calculates a corrected meal period by further adding a preset time before an initial detection point in time of the overall eating behavior into the calculated meal period.

7. The method according to claim 5, wherein the wrist angle calculating unit calculates the wrist angle variation value by a below equation, $$\vec{D}_{wrist} = \cos^{-1}(W/2^{Res}/R)$$

wherein the $\vec{D}_{wrist}$ is a wrist angle variation value, w is a wrist acceleration variation value, Res is resolution of the acceleration sensor, and R is a magnitude of a measuring range of the acceleration sensor.

8. An apparatus for calculating a meal period, the apparatus comprising:
a wrist acceleration calculating unit which calculates a wrist acceleration variation value which is a variation value of acceleration in respect to a motion of a user's wrist which is measured based on gravitational acceleration;
a wrist angle calculating unit which calculates a wrist angle variation value which is a variation value of an angle to the user's wrist based on a gravitational direction by using the wrist acceleration variation value;
an eating behavior candidate pattern detecting unit which detects an eating behavior candidate pattern based on a predetermined reference by applying one or more threshold values to the wrist angle variation value; and
a meal period calculating unit which calculates a meal period based on the number of times the eating behavior candidate pattern occurs,
wherein the one or more threshold values include a first threshold value, and a second threshold value which is an angle value greater than the first threshold value, and the eating behavior candidate pattern detecting unit detects the eating behavior candidate pattern by detecting a pattern in which the wrist angle variation value starts with an angle value smaller than the first threshold value and increases to an angle value greater than the second threshold value, and then the wrist angle variation value starts with an angle value greater than the second threshold value and decreases to an angle value smaller than the first threshold value,
wherein the meal period calculating unit calculates a cumulative result in respect to the eating behavior candidate pattern by accumulating the number of times the eating behavior candidate pattern occurs, defines a case, in which the eating behavior candidate pattern occurs a preset number of times or more for a preset time based on the cumulative result, as a partial eating behavior which is a part of an overall eating behavior of the user, and
determines the overall eating behavior including the determined partial eating behavior of the user, and calculating a total duration time of the overall eating behavior as the meal period,
wherein the eating behavior candidate pattern has an angle value between a minimum limit value, which is an angle value smaller than the first threshold value, and a maximum limit value which is an angle value greater than the second threshold value, and
wherein when the wrist angle variation value is smaller than the minimum limit value or when the wrist angle variation value is greater than the maximum limit value, the eating behavior candidate pattern detecting unit excludes next behavior at the eating behavior candidate pattern.

9. The apparatus according to claim 8, further comprising:
a three-axis acceleration sensor which measures the acceleration in respect to the motion of the user's wrist,
wherein the wrist acceleration calculating unit measures initial gravitational acceleration with respect to three axes of the acceleration sensor in an initial state in which one of the three axes of the acceleration sensor is positioned toward a ground surface, calculates an initial angle between the gravitational direction and one of the three axes of the acceleration sensor by using the measured initial gravitational acceleration with respect to the three axes of the acceleration sensor, converts, by using the calculated initial angle, the gravitational acceleration, which is measured in real time at the three axes of the acceleration sensor, into converted gravitational acceleration which is gravitational acceleration with respect to three gravitational axes that are three axes using the gravitational direction as a reference axis, and calculates a variation value of the converted gravitational acceleration corresponding to the reference axis which varies in accordance with the motion of the user's wrist, as the wrist acceleration variation value.

10. The apparatus according to claim 8, wherein the wrist acceleration calculating unit calculates a modified wrist acceleration variation value by removing a variation value of the acceleration in respect to the motion of the user's wrist which has a period shorter than a preset length among the variation values of the acceleration in respect to the motion of the user's wrist, and the wrist angle calculating unit calculates the wrist angle variation value based on the modified wrist acceleration variation value.

11. The apparatus according to claim 10, wherein the wrist acceleration calculating unit removes a variation value of the acceleration in respect to the motion of the user's wrist which has a period shorter than the preset length by using a low pass filter (LPF).

12. The apparatus according to claim 8, wherein the wrist angle calculating unit calculates a normalized wrist acceleration variation value by normalizing the wrist acceleration variation value, and then calculates the wrist angle variation value by calculating the inverse function of cosine with respect to the normalized wrist acceleration variation value.

13. The apparatus according to claim 8, wherein the meal period calculating unit calculates a corrected meal period by further adding a preset time before an initial detection point in time of the overall eating behavior into the calculated meal period.

14. The apparatus according to claim 12, wherein the wrist angle calculating unit calculates the wrist angle variation value by a below equation, $$\vec{D}_{wrist} = \cos^{-1}(W/2^{Res}/R)$$

wherein the $\vec{D}_{wrist}$ is a wrist angle variation value, w is a wrist acceleration variation value, Res is resolution of the acceleration sensor, and R is a magnitude of a measuring range of the acceleration sensor.

* * * * *